United States Patent
Weldon et al.

(10) Patent No.: US 6,366,563 B1
(45) Date of Patent: Apr. 2, 2002

(54) METHOD, COMPUTER PROGRAM PRODUCT, AND APPARATUS FOR COLLECTING SERVICE LEVEL AGREEMENT STATISTICS IN A COMMUNICATION NETWORK

(75) Inventors: Jedrick J. Weldon; Joshua Osborne, both of Fairfax, VA (US)

(73) Assignee: MCI WorldCom, Inc., Jackson, MS (US)

( * ) Notice: Subject to any disclaimer, the term of this patent is extended or adjusted under 35 U.S.C. 154(b) by 0 days.

(21) Appl. No.: 09/469,507

(22) Filed: Dec. 22, 1999

(51) Int. Cl.[7] .............................................. H04L 12/26
(52) U.S. Cl. ...................................... 370/252; 370/401
(58) Field of Search ................................ 370/252, 241, 370/242, 248, 401, 249

(56) References Cited

U.S. PATENT DOCUMENTS

| | | | | |
|---|---|---|---|---|
| 5,867,483 A | * | 2/1999 | Ennis, Jr. et al. | 370/252 |
| 5,878,032 A | * | 3/1999 | Mirek et al. | 370/252 |
| 5,886,643 A | * | 3/1999 | Diebboll et al. | 340/825.08 |
| 5,930,257 A | * | 7/1999 | Smith et al. | 370/401 |
| 6,058,102 A | * | 5/2000 | Drysdale et al. | 370/252 |

* cited by examiner

*Primary Examiner*—Chau Nguyen
*Assistant Examiner*—D. Trinh (57) ABSTRACT

A probing router is used at a source site of a virtual private network. In-band probing operations are performed by components within the probing router, using processing resources available from a router engine portion of the probing router. In this way, changes in the network and service level agreement statistic collection processes may be quickly and easily accommodated within the probing router. Furthermore, the probing router communicates the probe message through an in-band communication channel so as to provide a direct measurement of service level data for the channel used for communicating information between the source site and a destination site.

6 Claims, 6 Drawing Sheets

BACKGROUND ART

METHOD, COMPUTER PROGRAM PRODUCT, AND APPARATUS FOR COLLECTING SERVICE LEVEL AGREEMENT STATISTICS IN A COMMUNICATION NETWORK

BACKGROUND OF THE INVENTION

1. Field of the Invention

The present invention relates to apparatuses, methods and computer program products that collect service level agreement (SLA) statistics in communication networks and especially virtual private networks (VPN).

2. Discussion of the Background

Communication networks provide an infrastructure by which messages (digital or analog) may be routed from a source to one or more destinations. Proprietary, exclusive networks may be used when messages are to be distributed only between a private set of network nodes. These proprietary networks may span only local regions, and are thus called local area network (LAN). Similarly, such proprietary networks may extend across a single city, and thus may be referred to as a metropolitan area network (MAN). When extending over a larger geographic region, where the nodes are separated by relatively large distances, the network is referred to as a wide area network (WAN).

However, the expense of establishing and maintaining a proprietary network whether it be a LAN, MAN or a WAN, is often not cost effective. Furthermore, maintaining the network often requires personnel with specialized skills, having job descriptions that may be well outside the scope of the company's main line of business. While the proprietary network does offer the advantages of dedicated security and avoidance of traffic congestion problems, the expense and maintenance issues associated with developing proprietary, exclusive-use networks is not often justifiable, particularly when publicly available resources are available, such as the Internet.

Virtual private networks (VPN) provide a cost effective alternative to proprietary networks. A VPN enables communication among a "community of interests" by enabling private traffic to be passed between at least two nodes within the VPN using a shared communication resource, such as the Internet. When the Internet is used as a component of the communication network, the VPN is referred to as an "Internet VPN". However, unlike un-regulated and uncontrolled communications over the Internet, a VPN is usually established by Internet service providers (ISPs), who provide differentiated services from other users who are not part of the VPN. The differentiated services for users of the VPN, are contractually governed by an agreement between the ISP and VPN customer in the form of a "service level agreement" (SLA).

The SLA may include provisions for a predetermined network availability, such as 99.9% average end-to-end availability over a one month period for 10 or more sites, and at least 99.8% average end-to-end network availability over a period of one month for 3 to 9 sites. Network speed is another metric of performance that is typically part of the SLA, where an average network latency may be specified to be 120 milliseconds (ms) for round-trip transmission between VPN sites within the United States or within Europe, for example. Some Internet service providers, such as UUNET will provide a service level guarantee and will credit an account of a VPN customer if the level of service, as defined in the SLA, was not achieved. An optional feature in VPNs is the availability of encryption for data packets so that unintended "listeners" will not be able to decipher the information content of the messages sent through the commonly available information channel.

VPNs, and in particular Internet VPNs, often choose to employ tunneling technology as a way to securely transfer data between two similar networks (e.g., private LANs) over an intermediate network such as UUNET net IP network. Tunneling (sometimes referred to as "encapsulation") encloses a first data packet in a new packet by appending a new header (transmitted in an unencrypted format) to the first data packet, so the network routes the new packet based on the information contained in the new header. The first data packet is usually encrypted when contained in the new data packet so no information can be gleaned from it, except by the intended recipient. The encapsulated packets travel through the network until they reach the destination identified in the new header. At the destination, the new header is stripped away and the first data packet is decrypted and processed. The tunneling and encryption may employ DES and 3DES standards-based technology for transferring data between network locations more securely via an OC-48 TCP/IP infrastructure, for example.

As determined by the inventors, several advantages to Internet VPNs include improved privacy, reduced cost relative to dedicated leased lines, and an improved coverage area, largely owing to the availability of the global reach of the Internet.

Figure 1:
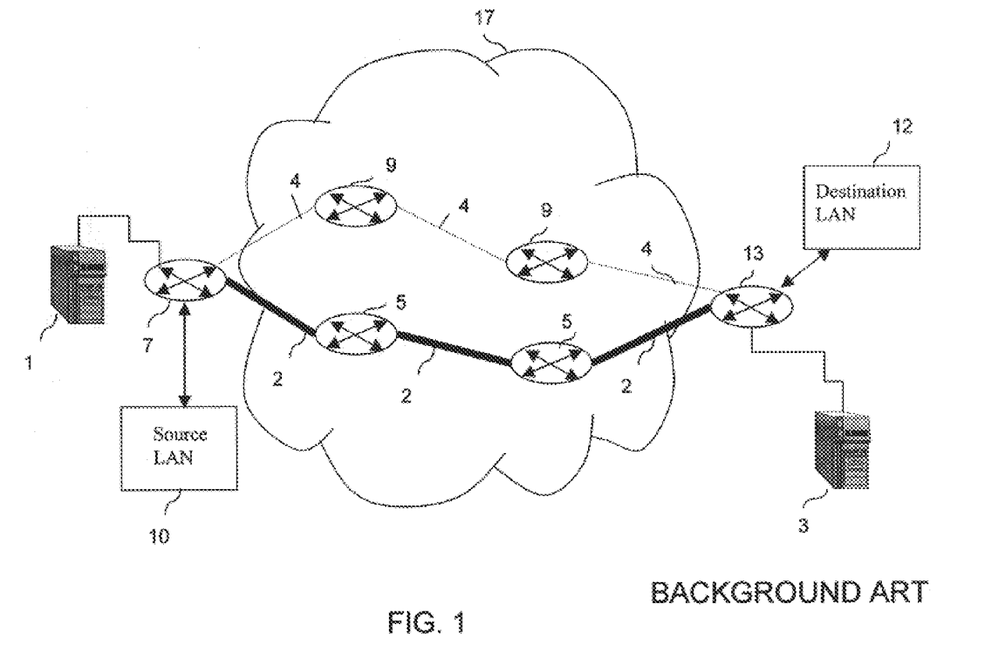
FIG. 1 is a block diagram of a conventional VPN that includes separate routers and destination probes.

As recognized by the present inventors, conventional Internet VPNs are suboptimal in flexibility and scaleability. FIG. 1, shows an example conventional VPN with a source probe 1 and destination probe 3 that cooperate to collect network SLA statistics. The source probe 1 is hosted on a personal computer using a UNIX operation system, for example, and has a particular IP address. The source probe 1 prepares a 1-packet probe (probe message) that is sent through a source router 7 and then through the network 17 to the destination probe 3. The source probe 1 includes in the probe message a time stamp, indicating the time at which the source probe 1 sent the probe message. The source router 7, which is maintained on a customer's site with the source probe 1, has a different IP address than the source probe 1. The router 7 also handles signals for terminals on a source LAN 10, which itself has a different IP address. As with the source probe 1, source router 7 and source LAN 10, the destination probe 3, destination router 13 and destination LAN 12 all have unique IP addresses.

The network 17 includes routers 9 that are interconnected by way of lines 4. Likewise, routers 5 are interconnected by lines 2. Interconnections between routers 9 and 5 are not shown to help illustrate the point that there are different physical paths that a packet may follow through the network 17 when traveling from the source probe I to the destination probe 3. The actual path that a particular packet follows (i.e., an "in-band" path, or channel) will be influenced by the source/destination pair included in its header. Because the source/destination pair will vary depending which device is generating the packet and which device is receiving the packet, packets handled by the source router 7 and ultimately headed through destination router 13 may follow different routes through the network 17. Routers 5 and 9 in the network include routing tables that direct how certain packets are routed, and thus these routers may handle one packet from the source probe 1, different from a packet generated by a terminal on the source LAN 10. Thus, a data packet from the source LAN 10 may follow a path through the routers 5 and lines 2 ("in-band" path) while the probe message may follow a path through the routers 9 and lines 4 (i.e., not "in-band"). Of course, the two paths may be the same, although there is no guarantee.

The operation of sending the probe message and collecting statistics is now described. The probe message is formed and sent from the source probe 1 at a predetermined time and a time stamp of the send time is included in the probe message. Once the probe message is passed through the network 17 and by the destination router 13 to the destination probe 3, the destination probe 3 recognizes that the probe message has been received. The destination probe 3 then sends a reply probe message to the source probe 1, and includes information in the reply probe message regarding the time that the destination probe 3 took between receiving the probe message and transmitting the reply probe message. Thus, the reply probe message includes the time stamp inserted by the source probe 1 and the remote latency caused by the destination probe 3. In this way, when the source probe 1 receives the reply probe message it is possible to determine the round trip time between when the source probe 1 originally sent the probe message and the time that the reply probe message was received by the source probe 1, less the remote latency time. The source router 7 and the destination router 13 may be 4500 CISCO routers that are configured to receive packets from both the source LAN 10 as well as the source probe 1. Thus, the source router 7 is generic in operation and is a separate network component hosted in a separate housing from the source probe 1.

Availability is one of the SLA statistics that is collected by way of the probing process. Because availability relates to a measurement that is taken over a period of time (or over a number of discrete events), the source probe 1 is configured to set a polling interval at 2.5 minutes so as to provide two measurements for a 5 minute window, and therefore provide a 5 minute resolution with regard to the availability statistic.

The present inventors recognized that the VPN architecture shown in FIG. 1 is suboptimal in that it does not offer the desired flexibility and scaleability features that would allow for independent upgrading and maintenance of the shared network 17. The present inventors have recognized that the shared network 17 may be reconfigured and upgraded for future operations. In doing so, it is even possible that additional nodes may be added to the VPN, or even the service level agreement may vary from time to time. Accordingly, it is a limitation with the VPN shown in FIG. I that the source probe 1 and destination probe 3 are "hard-wired" to operate at certain polling intervals. Furthermore, the source and destination probes do not necessarily send the probe messages in-band (i.e., over the same physical path traversed by data packets sent between the source LAN 10 and the destination LAN 12), even though the SLA is tied to the performance of the in-band channel.

Accordingly, by having the source probe 1, as well as the destination probe 2, implemented in a separate computer outside of the source router 7 and having a separate IP address, operators of the VPN are therefore limited by the capabilities of the source probe 1 to accurately collect SLA statistics. This is especially problematic when changes are to be made to the "core" shared network 17. Furthermore, the amount of space required to host the source probe 1, the source LAN 10 and the router 7, adds to maintainability restrictions at the source site.

SUMMARY OF THE INVENTION

In light of the above-discussed and other limitations of conventional systems and methods for collecting SLA statistics, an object of the present invention is to overcome these and other limitations by providing a software reconfigurable probing router.

A feature of the present invention is to include a probing router at both the source site and the destination site such that the probing operation is performed within the router housing itself, using processing resources available from the router. In this way, the probing operation is performed in software (although hardware/firmware/software combinations are alternatives as well) so that changes in the core network and SLA statistic collection processes may be quickly and easily accomplished. Furthermore, the probing router sends the probe message through the same path as the data, thus providing a direct measurement of SLA data.

Another feature of the present invention is that an operations center connected to the network enables a remote "VPN builder" to remotely configure each of the probing routers in the VPN, so that within a short period of time the topology of the VPN may be enabled by informing each of the probing routers of the statistic collection obligation it has and communicating and replying to probe messages with other probing routers in the VPN. Furthermore, the operation center enables a remote probe poller processor to receive, compile, and calculate SLA statistics for the VPN. The statistics may be collected at rates consistent with the SLA for the particular VPN. Furthermore, the operating center enables a SLA reporting system to report data collected by the probe poller processor in a format that is convenient for the VPN customer to verify that the SLA metrics were in fact complied with during a particular operation cycle.

Other features and advantages of the present invention will become readily apparent from the following detailed description when read in conjunction with the accompanying drawings.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Referring now to the drawings, specific terminology will be employed for the sake of clarity. However, the present invention is not intended to be limited to the specific terminology so selected and it is to be understood that each of the elements referred to in the specification are intended to include all technical equivalents that operate in a similar manner.

Figure 2:
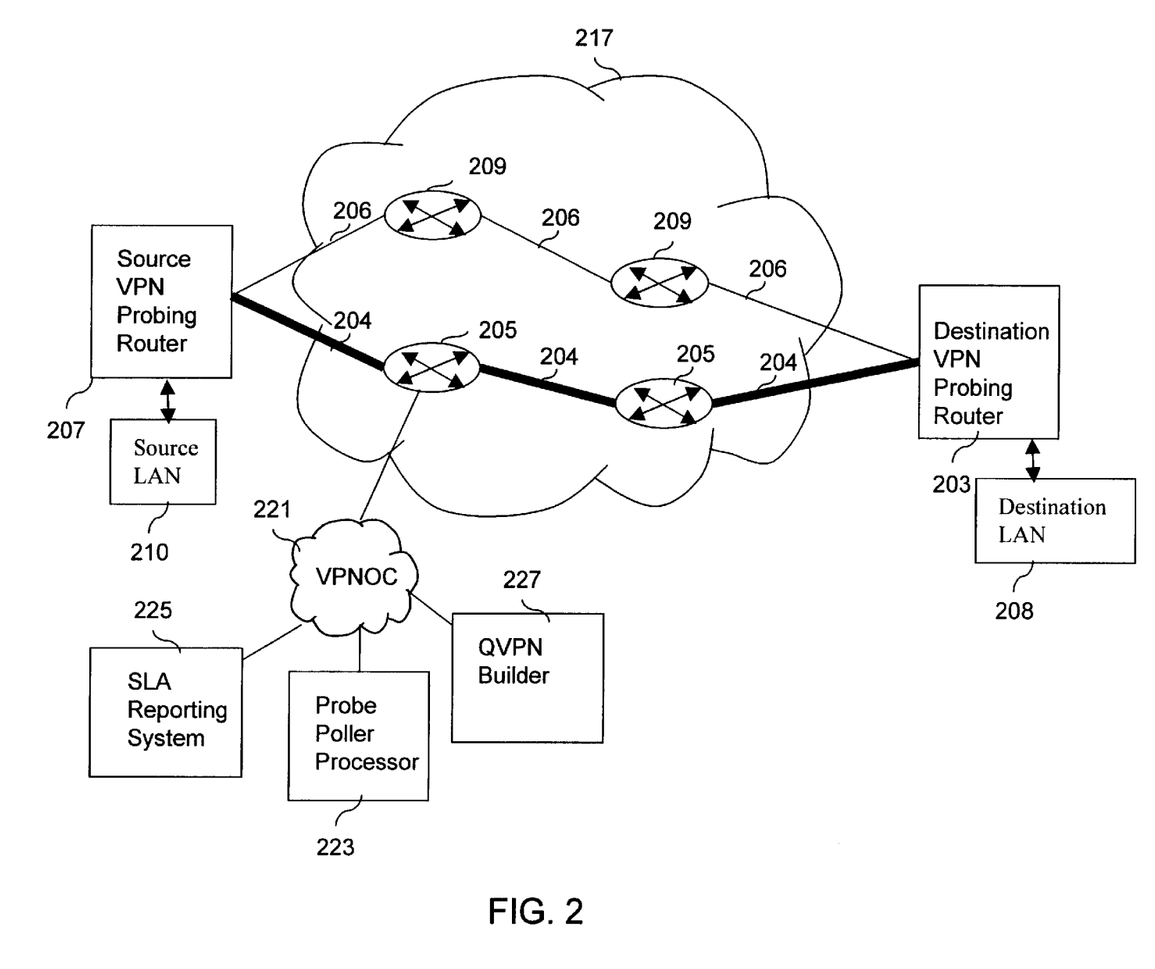
FIG. 2 is a block diagram of a VPN that employs a probing router according to the present invention.

FIG. 2 is a block diagram of a VPN and supporting components according to the present invention. Data from a terminal (i.e., data source) node at a source LAN 210 is sent by way of a source VPN probing router 207 through a network 217, which may be the Internet or another shared network, to a destination VPN probing router 203 (sometimes referred to as "PR") and finally to a destination LAN 208. The network 217 is a shared resource such as the Internet. However other types of networks may be used that employ TCP/IP, or a related packet switched protocol such as IP version 4 or IP version 6. The physical medium in the network 217 may be made of any combination of terrestrial ground lines, optical lines, or wireless links that will form the in-band channel 204 or other channel paths 206 for example. Various nodes are hosted in the network 217 that may be configured to become part of the VPN, as will be discussed. These nodes are served by routers 205 and 209 for example. For convenience, lines 204 are shown with a darker line indicating that this is the path through which the source LAN 210 and destination LAN 208 communicate with one another in a first scenario. Dynamic routing tables in the routers 209 and 205 dictate the path to be followed by the message traffic (whether encapsulated or not), where the chosen path is affected by the source/destination pair included in the message traffic header. Since the source VPN probing router 207 and the destination VPN probing router 203 both have IP addresses that may be used as header source/destination pairs in headers of encapsulated packets, both probe packets and encapsulated data packets will traverse the same path. As a consequence, the SLA statistics will be determined from in-band channel measurements since the probe message traverses the same path as the data packets.

As can be seen, at the site where the source LAN 210 and source VPN probing router 207 are located, the source VPN probing router 207 need only connect to the source LAN 210, but not a separate source probe 1 as was the case with the configuration in FIG. 1. The source VPN probing router 207 relays message traffic between the source LAN 210 and the network 217 according to conventional routing operations. In addition, the router includes program memory that holds therein instructions that are executed by a processor to form a probe mechanism that, at programmable time intervals, generates a packet data unit (a probe message) for transmitting through the in-band channel 204 to the destination router 203. The probe message includes a time stamp that indicates the time at which the source VPN probing router 207 actually sends the message over the in-band channel 204 to the destination VPN router 203. Alternatively, the time stamp is stored and retained by the VPN probing router 207.

The polling interval at which the source VPN probing router 207 sends the probe messages is set by a VPN operation center 221 (VPNOC) that downloads a control instruction to the source VPN probing router 207. The control instruction includes an appropriate time interval indicator (polling interval) used for performing the probing operation. The probe message, after having passed through the in-band channel 204, is received at the destination VPN probing router 203, which identifies the probe message and subsequently prepares a reply probe message along with data (i.e., remote latency data) regarding the amount of time it took the destination VPN probing router 203 to prepare and send the reply probe message back to the source VPN probing router 207. Once the source VPN probing router 207 receives the reply probe message, the source VPN probing router 207 stores the data contained therein but ultimately will send the data retrieved from the probe message in the reply probe message to the probe poller processor 223, which is connected to the VPNOC 221. Part of the remote latency for the destination VPN probing router 203 is a time required to perform the tunneling operation for deencapsulating and subsequently encapsulating the probe message and reply probe message respectively.

By implementing the probing operations in software in the source VPN router, and making the probing operations software reconfigurable, the system shown in FIG. 2 is able to offer several advantages. One advantage is that separate hardware components are not required to perform the probing and routing operations, but rather the resources available from the router 207 are employed for performing the probing operation. Furthermore, the parameters of the probing operation are software settable, and may be remotely adjusted from the VPNOC 221, and usually from the QVPN builder 227. One advantage of including the probing operations in the source VPN router is that additional components need not be maintained at a customer's premise. Furthermore, the processing demands of the probing operations are sufficiently small with respect to those performed in a traditional router such that sufficient processing power and memory are available for performing the probing operation.

Including the probing operations within a router 207, assists in offering a more flexible and scalable architecture than the conventional approach. For example, SLA statistic collection parameters may be altered by the QVPN builder 227 by changing software settings in the probing router which allows for upgrades in equipment at the source site or the destination site to be upgraded quickly and efficiently when changes to the SLA statistic collection operation are desired. Furthermore, the inventive system helps to achieve a goal of isolating the functions performed in the network 217 from those performed at the source site or the destination site. Consequently, the operator of the network 217 may upgrade the network independent of whether any changes are made at the source site or the destination site. The isolation of the functionality performed by the network 217 and that performed by a source equipment or destination equipment is accomplished by isolating "core" communication transport functions performed in the network 217 from node-specific operations performed at different nodes connected to the network, such as at the source site. In this way, the network 217 may be upgraded separate from the equipment at the source site or the destination site. Once the core network is changed, any reprogramming of the VPN probing routers is accomplished by configuration commands sent from the QVPN builder.

The VPNOC 221 hosts the QVPN builder, which is a software-based mechanism used to configure VPN topology, set security profiles and distribute keys to each VPN site in an automatic fashion. Consequently, adding new VPN sites or adding more tunnels to the VPN is quickly performed since all of the probing routers may be adjusted in operation by control instructions sent from the QVPN builder. Accordingly, network operators do not need to manually secure IPSec tunnels for each of the IP nodes required to communicate over the VPN. By employing the VPN builder in the network architecture as shown with the use of VPN probing routers 207 and 203 and other probing routers, it is possible to easily scale a VPN according to customer requirements.

The probe poller processor 223, which is also hosted in the VPNOC 221, is able to receive SLA statistics data from the source and destination VP probing routers. The probe poller processor 223 then calculates an average total return time $R_{tt}$ for transmission of a probe message and return of a reply probe message according to the equation $$R_{tt}=(T_2-T_1)-R_L, \text{ where}$$

$R_{tt}$ is round trip time of a probe message and reply probe message, $T_2$ is a time at which the reply probe message is received from the destination probing router, $T_1$ is a time at which the probe message is sent from the source VPN probing router and $R_L$ is remote latency, which refers to the amount of time that the destination VPN probing router requires to prepare and send the reply probe message in response to receiving the probe message.

The probe poller processor 223 is implemented in software and executed on a processor, but may also be implemented in any combination of hardware and/or firmware such as with an application specific integrated circuit. The probe poller processor 223 determines that an availability outage occurred when two adjacent packets are observed as being lost. However, other availability calculations may be performed as well, such as by determining availability on a packet by packet basis. A particular packet is viewed as being lost if $R_{tt}$ exceeds a predetermined amount. A packet-loss rate may be determined by observing a number of total packets sent within a predetermined time period, perhaps within a five minute window, or even a one month window, and determining a ratio of the number of reply probe messages received versus the number of probe messages sent. By collecting and saving packet-loss information on a packet by packet basis, availability may be calculated as [number of probe messages sent—dropped packets]/[total number of probe messages sent]. Availability may be determined in a variety of other ways, such as whether a predetermined number of packets are dropped within a predetermined period of time (for example two packets dropped in 5 minutes, where the polling interval is 2.5 minutes).

More particular implementation details are now described. A Probe Poll List is maintained as an ASCII text file. This file can be called as a parameter by the probe poller processor on startup. If a file parameter is passed, this overrides any Probe Poll List maintained. in a preference file. Additional probes can be configured directly through a configuration edit display. Through the menu options for this screen, the user can add, delete or import Probes to the Probe Poll List. The default Probe Poll List resides in the root level application directory called, probeList.txt. This file can be created with any standard text editor. The Probe Poll List file is organized by VPN. The VPN is defined (created) as:

VPN=<vpn name>

Where <vpn name> is the name of the current VPN. For each probing router associated with this VPN, a line of text follows to define the required probing router parameters. Each probing router parameter line begins with:

PR=<ip address>

Additional parameters are optional and all parameters are delimited by colons. Any missing parameters will be set by defaults in the application when the Probe Poll List is parsed.

| Parameter | Description |
|---|---|
| NAME=<sysName> | The sysName of the probing router. This is set by the probe poller processor during the initial poll sequence. |
| SNMP=<version> | V2 for snmp V2 access or V3 for snmp V3 access. |
| COMMUNITY=<community string> | The snmp V2 community string. |
| PORT=<snmp port> | This defaults to 161. |
| TIMEOUT=<value> | The snmp timeout value for requests to this probing router. |
| RETRIES=<value> | The snmp retry value for requests to this probing router. |
| USER=<user name> | The snmp V3 user id. |
| AUTHPROTO=<authentication protocol> | The snmp V3 authentication protocol to use: NONE, MD5, or SHA. |
| AUTHPWD=<authentication password> | The snmp V3 authentication password. |

Probe Poller Processor Output Format

The characteristics of the latency logs are as follows:

File Name: latency.log.<timestamp when file closed>.gz

Directory Structure on the Monitoring System Server:

$VPNLOGS/vpnlogs-<collector process pid>-<sequenctial counter>/<probe hostname>/<vpn name>

File Characteristics: ASCII, colon delimited fields, compressed with gzip, lines beginning with "#" are comment fields, All timestamps are UTC, a "$" character is output on the last line to terminate the file.

The file contents and data structure saved in memory of each record saved in the VPN probing router is as follows:

| Field | Description |
|---|---|
| dstIP | IP address of the remote PR to receive the probe packet |
| dstPort | Port on which the remote PR listens |
| srcIP | IP address of the PR probe which initiates the probe packet |
| srcPort | Port on which the PR probe listens |
| seqstart | Timestamp assigned when the PR probe initializes |
| seqcount | Next sequential counter for this remote PR |
| send-seconds | Timestamp when the PR probe initiates a probe packet |
| send-ms | Coupled with send-seconds B microseconds |
| recv-seconds | Timestamp when the PR probe receives the probe packet response from the remote PR |
| recv-ms | Coupled with recv-seconds - microseconds |
| remote-process-ms | Number of microseconds spent processing the sample packet on the remote PR to turn around a response packet |
| flags | Bit 1 indicates packet type: 0 = data; 1 = test |

The probing routers may generate SNMP Traps when the number of packets lost in a predetermined amount of time exceeds a predetermined threshold, and if the probe latency is measured as exceeding a predetermined time.

SLA statistical data compiled by the probe poller processor 223 is provided to the SLA reporting system 225. The SLA reporting system 225 provides to a customer a condensed aggregation of data collected by the probe poller processor 223 so that the customer may review whether the SLA was complied with during the reporting interval. In one embodiment, the SLA system 225 aggregates the data on a month-by-month basis and provides the data via a server on an Internet web-site for review by customers of the VPN. Alternatively, a computer and printer are employed to provide written reports summarizing the SLA statistics that were collected for the customer of the VPN.

The probing operations are performed on the network 217 at layer 3 (i.e., Er layer). Thus, the operation is performed independent of the physical and data link layers and thus may be used in any one of a variety of different network configurations such as frame relay, ATM, FDDI, packet-over SONET, Ethernet, fibre channel as well as others. A description of example network systems that may be employed with the current invention is provided in "Data and Computer Communications", by William Stallings, Fifth Ed., Prentice Hall, Chapter pages 401–458, 1997, the entire contents of which being incorporated herein by reference. Furthermore, Chapters 15 and 16 provide further description of specific protocols and architectures that may be employed with the present invention, and thus Chapters 15–16, pages 497–584 are also incorporated herein by reference.

While encryption may be employed to improve information privacy, encryption need not be employed and thus is an optional feature, selected by a customer when subscribing to the VPN service. The source VPN probing router 207 may also employ multi-protocol label switching that prioritizes packets through the core communication network 217.

Figure 3A:
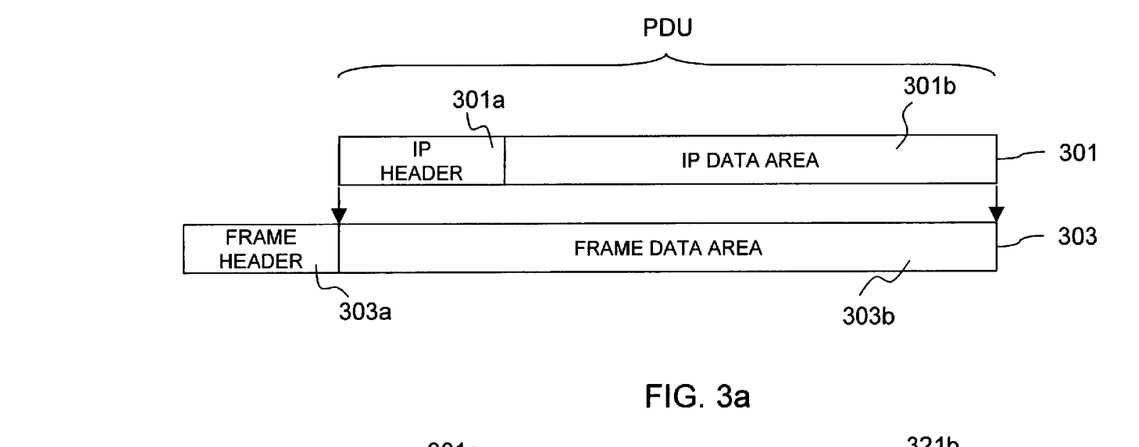
FIGS. 3a–3c respectively represent data structures for a packet data unit for an Internet protocol packet employed as part of the present invention, as well as data structures for a probe message and reply probe message according to the present invention.

FIG. 3a illustrates a generic protocol data unit for a probe message sent by the source VPN probing router 207 according to the present invention. Consistent with the operation of TCP/IP, IP header 301a and IP data area 301b form part of an EP datagram portion of a network-level packet 303. The network-level packet 303 includes a frame header 303a and a frame data area 303b.

Figure 3B:
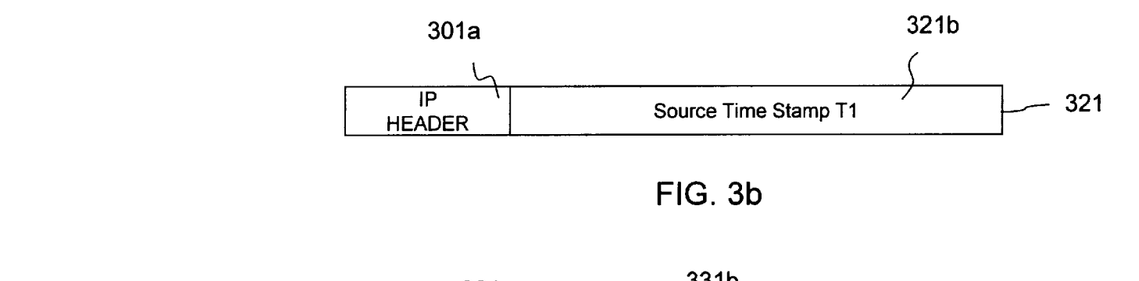

FIG. 3b shows a functional description (i.e., those data fields that are relevant to the present probing discussion) of an IP datagram portion of the packet employed for the probe message. IP header 301a is followed by a source time stamp 321b, which is placed in the IP data area portion of the IP datagram 321. This source time stamp T1 is transmitted in the probe message to the destination VPN probing router 203. Alternatively, the source VPN probing router does not include the time stamp T1, but does save the time stamp in memory for later use after the reply probe message is received.

Figure 3C:
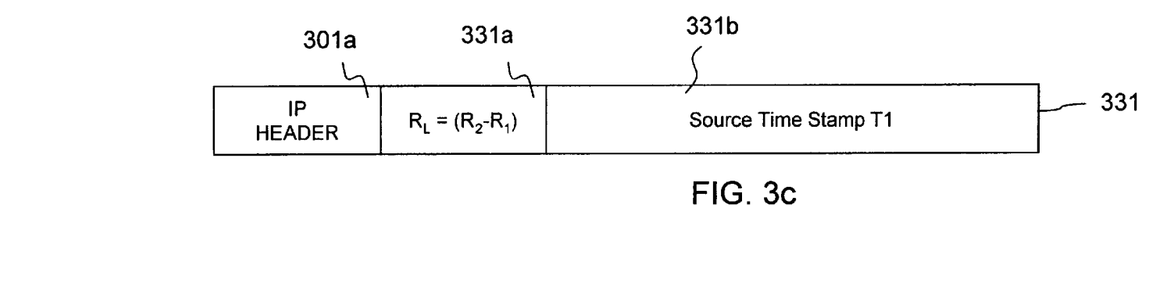

FIG. 3c shows the IP datagram for the reply probe message. As shown, the IP datagram 331 includes a field 331a that holds a measurement value (an indicator) of the remote latency $R_L$ as being equal to $R_2-R_1$, where $R_2$ is the time that the destination VPN probing router sent the reply probe message, and $R_1$ is the time at which the probe message was received by the destination VPN probing router 203. Accordingly, the remote latency $R_L$ is the difference between these two times and measures the amount of time that was required by the destination VPN probing router 203 to generate and send the reply probe message after receiving the probe message. The reply probe message also includes the source time stamp T1 321b. The source probing router 207 then receives the reply probe message at time T2.

Figure 4:
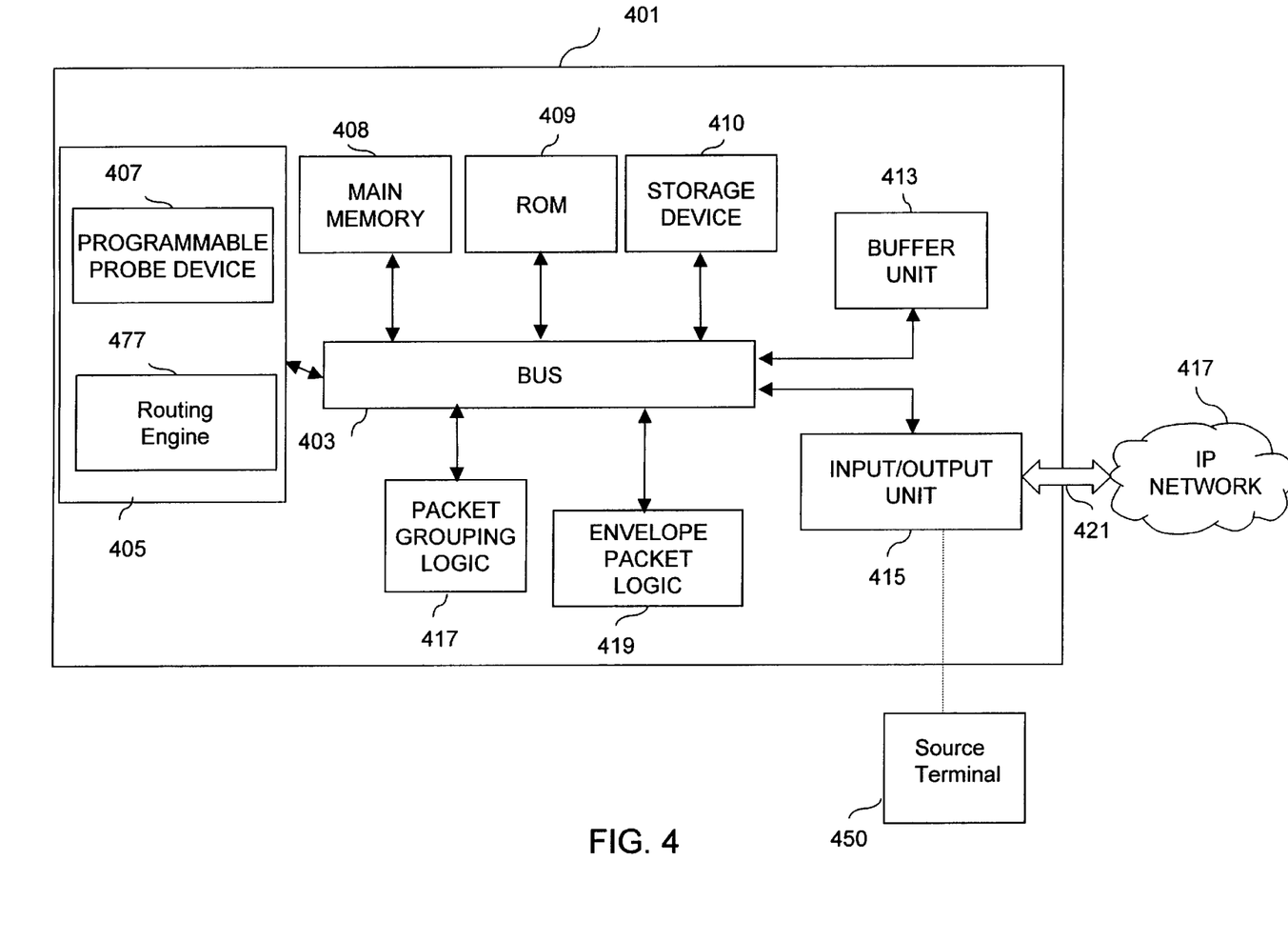
FIG. 4 is a block diagram of components of a probing router according to the present invention.

FIG. 4 represents the internal components of a source VPN probing router according to the present invention. Within a housing 401, the probing router includes a data bus 403 that interconnects a processor 405 with other components connected to the bus 403. In particular, the processor 405 executes computer readable instructions saved on ROM 409 to implement both a routing engine 477 as well as the programmable probe device 407.

The main memory 408 is a RAM that receives software settable parameters sent from the QVPN builder 227 (FIG. 2) for setting the probing parameters that would be executed by the programmable probe device 407. The programmable probe device 407 is shown to be internal to the processor 405, which is the case when it is implemented only in software, but may also be a separate component that communications with the other components by the bus, or other signal relaying mechanism, such as a local bus or optical link. The programmable probe device includes a timer that generates a probe message after a predetermined time has elapsed since the last probe message was sent. The programmable probe device 407 either maintains internally thereto, or retrieves from main memory 408, a polling interval parameter that was set by the QVPN builder 227. Furthermore, the programmable probe device 407 also receives an indication from the QVPN builder 227 which destination VPN probing routers the source VPN is to communicate with so that tunnels may be established therebetween.

A storage device 410 is also a RAM and is used to hold information regarding round trip delay and whether packets are dropped. This information is later sent to the probe poller processor 223, either on demand from the probe poller processor 223 or at periodic intervals as a software settable parameter and saved in main memory 408. The packet grouping logic 417 and envelope packet logic 419 cooperate to form IP packets for assessing whether received packets are to be routed to a device connected to the router, or not. Likewise, the packet grouping logic 417 and envelope packet logic 419 cooperate to form packets for sending over the IP network 417 by way of the input/output unit 415. A buffer unit 413 serves as a buffer for saving and holding message traffic when the processor 405 is busy (for inbound messages) or for sending packets when either the input/output unit 415 is busy or the IP network 417 is busy. The input/output 415 connects by way of a bus 421 to the IP network 417. A local source terminal 450 also connects to the input/output unit 415 for local accessability to the router. The IP network 417 and source terminal 450 connect through ports (or connectors) to the housing 401.

Figure 5:
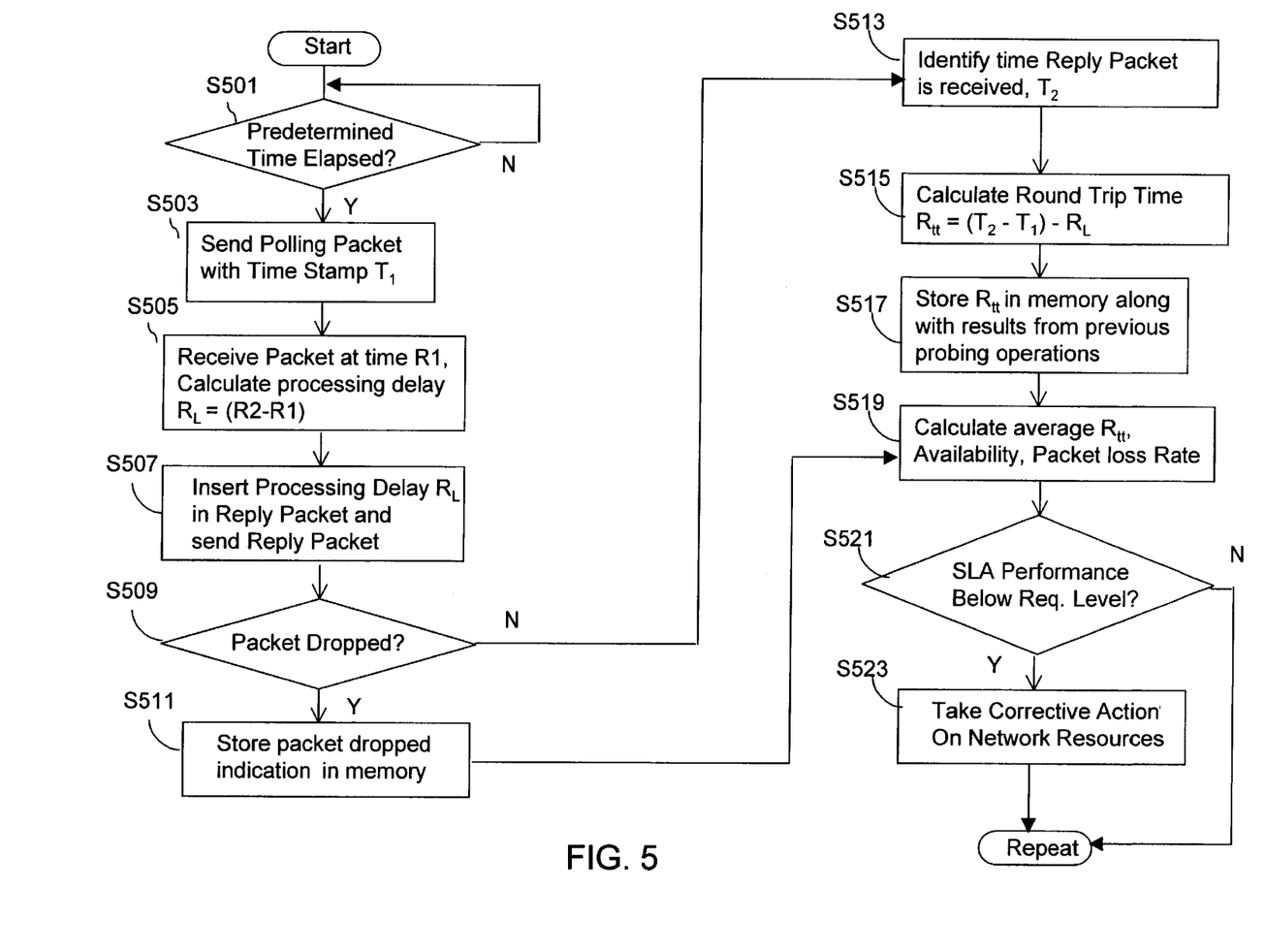
FIG. 5 is a flowchart of a process for employing the probing routers so as to collect SLA statistics according to the present invention.

FIG. 5 is a flowchart showing a process flow for collecting SLA statistics over the VPN. The process begins in step 501 where an inquiry is made regarding whether a predetermined time period has elapsed since the source VPN probing router has sent the last probe message. If the response to the inquiry is negative, the inquiry is made again until the time period has in fact elapsed. Once the response to the inquiry is affirmative, the process proceeds to step 503 where the source VPN probing router sends a polling packet to the destination VPN probing router 203. The polling packet (probe message) optionally includes a time stamp T1 therein. Alternatively, the source VPN probing router simply stores in memory the time at which the polling packet has been sent, thus not notifying the destination VPN probing router when the message was in fact sent.

After step 503, the process proceeds to step 505 where the probe message is received at a time $R_1$ at the destination VPN probing router. The destination VPN probing router then prepares a reply probe message and sends the reply probe message at a time $R_2$ such that the remote latency (i.e., turn-around time of the destination VPN probing router) is given by $R_L=R_2-R_1$. The process then proceeds to step 507 where the remote latency (or processing delay) $R_L$ is inserted in the reply probe message and the reply probe message is then sent.

After step S507, the process proceeds to step S509 where the programmable probe device 407 (FIG. 4) compares the amount of time between when the probe message was sent (T1) and when (if at all) a reply probe message is received (T2). In step 509 if it is determined that the difference between T2 and T1 is greater than a predetermined amount (a software settable parameter) then it is determined that the packet (probe message) was dropped. If the packet was dropped, the process proceeds to step S511 where an indication is saved in memory 410 (FIG. 4), or sent directly to the probe poller processor 223 (FIG. 2) indicating that a packet was dropped. The process then proceeds to step S519.

If however, the response to the inquiry in step S509 is negative, the process proceeds to step 513 where the time stamp $T_2$ is determined from when the reply packet (reply probe message) is received and the process then proceeds to step S515 where a round-trip time $R_{tt}$ is calculated. The calculation for round-trip time is determined as $R_{tt}=(T_2-T_1)-R_L$. The process then proceeds to step S517 where $R_{tt}$ is stored in memory at the probing router, although alternatively the data may be sent directly to the probe poller processor 223 at the VPNOC 221.

The probe poller processor 223 gathers information from the respective probing routers in the VPN and calculates average round-trip time, $R_{tt}$, availability, and packet loss rate for each tunnel as well as for the entire VPN. After having collected these SLA statistics, the process proceeds to step S521 where an inquiry is made regarding whether an SLA performance is judged to be below a required level, typically the service level agreement threshold levels. If the response to the inquiry in step 521 is negative, the process repeats so as to maintain a SLA statistical retrieval monitoring process. On the other hand, if the response to the inquiry in step 521 is affirmative, the process proceeds to step 523 where corrective action is taken on the network resources. This may include dispatching a trouble-shooting technician to identify a source of the problem or adjusting the software settable parameters in the probing router, so as to be less stringent on the service level requirements imposed on the network. The corrective action may also include providing a refund to a client, if the service level agreement statistics were in fact below the required level. After step 523 the process then repeats so as to continue the SLA statistic collection and analysis operation.

Figure 6:
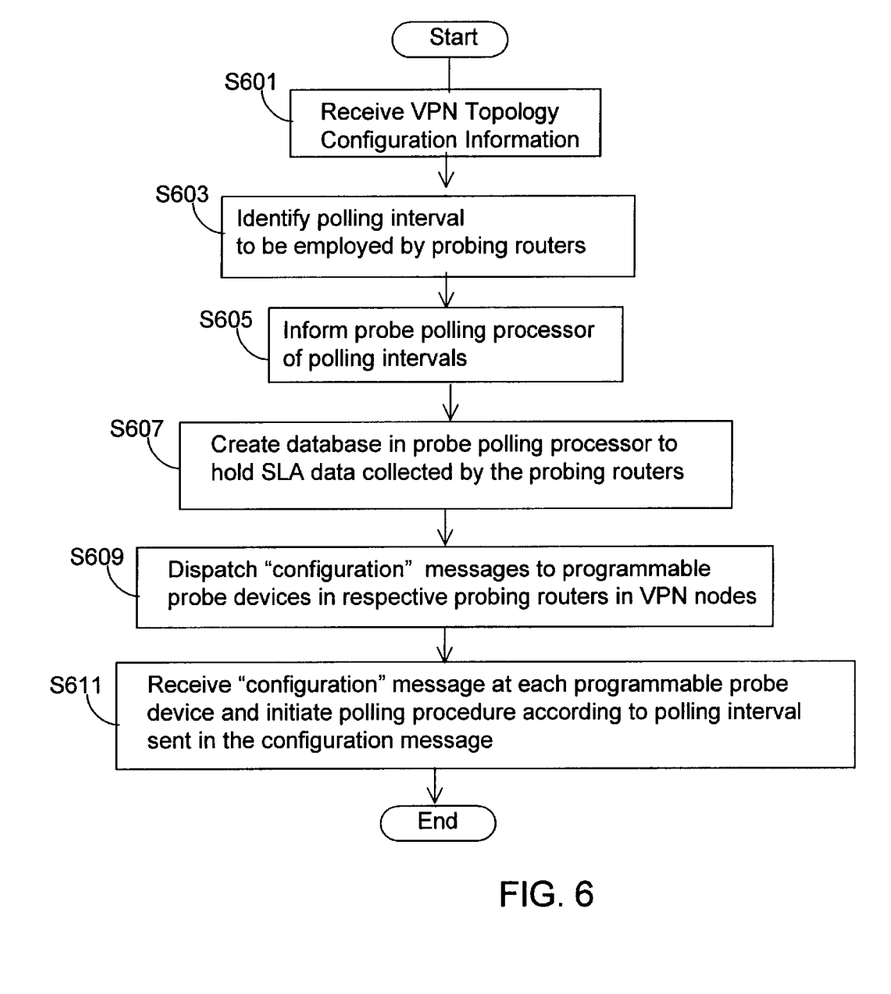
FIG. 6 is a flowchart of a process for configuring and collecting SLA statistic information according to the present invention.

FIG. 6 is a flowchart of a process for automatically and remotely configuring a VPN architecture according to customer-specified requirements. The process begins in step S601 where the QVPN builder 227 is provided with VPN topology configuration information, which identifies the different VPN nodes that will be used in the customer-specified VPN. The process then proceeds to step S603 where the probing routers are either manually assigned a polling interval, or a default setting is included, such as two minute intervals. The process then proceeds to step 605 where the QVPN builder 227 sends configuration messages to the respective probing routers by way of the network 217. The probing routers then set the software settable parameters for the programmable probe device 407 either in the main memory 408 or in the programmable probe device itself.

After step S605 the process proceeds to step S607, where the programmable probe device 407 (FIG. 4), causes the SLA statistical data that is saved in the storage device 410 to be sent to the probe poller processor 223 (FIG. 2). The probe poller processor 223 creates a database in the probe polling processor and holds the data therein for calculation and distillation of SLA statistical data.

In the event that changes are required in the network, the process proceeds to step 609 where the QVPN builder 227 dispatches a "configuration" message to respective of the programmable probe devices in the probing routers. The configuration messages include the software settable parameters used by the probing routers to determine the polling interval, dropped packet threshold decision time, and other parameters such as particular node addresses to which to communicate with in determining round-trip time for packet transmission. Once the configuration messages are dispatched, the process proceeds to step S611 where the configuration messages are received at each of the programmable probe devices and the programmable probe devices employ the parameters contained therein to perform probing operations at the polling interval identified in the configuration message. Subsequently the configuration process ends.

The processes and control mechanisms set forth in the present description may be implemented using conventional general purpose microprocessors in the routers that are programmed according to the teachings of the present specification, as will be appreciated by those skilled in the relevant art(s). Appropriate software coding can readily be prepared by skilled programmers based on the teachings of the present disclosure, as will also be apparent to those skilled in the relevant art(s).

The present invention thus also includes a computer-based product that may be hosted on a storage medium and include instructions that can be used to program a computer to perform a process in accordance with the present invention. The storage medium may include, but is not limited to, any type of disk including floppy disks, optical disks, CD-ROMs, magneto-optical disks, ROMs, RAMs, EPROMs, EEPROMs, flash memory, magneto or optical cards, or any type of media suitable for storing electronic instructions.

Obviously, numerous additional modifications and variations of the present invention are possible in light of the above teachings. It is therefore to be understood that within the scope of the appended claims, the invention may be practiced otherwise than as specifically described herein.

What is claimed is:

1. A method collecting network performance statistics, comprising steps of:
    preparing a probe message with a probing router;
    sending said probe message over an in-band communication channel;
    measuring a propagation time for said probe message to reach a predetermined location;
    transmitting a service level agreement statistic from a probing router to a network operation center;
    combining at said network operation center said service level agreement statistic with other service level agreement statistics from other in-band channels to provide a compilation of service level agreement statistics; and
    presenting said compilation of service level agreement statistics to a user of a virtual private network.

2. The method of claim 1, wherein said sending step comprises sending said probe message in the in-band communications channel of a virtual private network.

3. The method of claim 1, wherein:
    said preparing step comprises including in said probe message a time stamp, T1, indicative of when said probe message is sent in said sending step; and
    said measuring step includes
        receiving a reply probe message sent from a destination probing router at a second time, T2, said destination probing router being located at said predetermined location, and extracting a remote latency indicator from said reply probe message, said remote latency indicator representing an amount of time between when said destination probing router received said probe message and when said destination probing router sent said reply probe message.

4. The method of claim 1, further comprising a step of:

calculating a service level agreement statistic from said propagation time.

5. A probing router comprising:

a bus;

a routing engine coupled to the bus and configured to forward packets to a communications network;

a communication network port coupled to the bus and configured to connect to a communication network and transmit a probe message and the packets therethrough;

a probe mechanism configured to generate and to send the probe message through said communication network port to the communication network at a time T1, wherein said probe mechanism is configured to receive a reply probe message at a second time, T2, sent by a destination router in response to receiving said probe message with a remote latency indicator therein so that service level agreement characteristics may subsequently be derived by comparing T1, T2 and the remote latency indicator; and a memory, wherein the probe mechanism is configured to identify and to store in the memory the service level agreement characteristics, said probe mechanism sending at least one of T1, T2, and the remote latency indicator to a probe poller device that calculates service level agreement statistics, said probe mechanism being configured to calculate a round trip time from T1, T2, and the remote latency indicator for a predetermined number of probing cycles and being configured to send the round trip time to the probe poller device.

6. The probing router of claim 5, wherein:

said probe mechanism being configured to save an indication that a packet is lost for a probing cycle when said probe mechanism determines that the round trip time exceeds a predetermined threshold.

* * * * *